Nov. 24, 1964 W. ST. JOHN WHITE 3,158,863
HYPERBOLIC RADIO NAVIGATION SYSTEM
Filed May 19, 1961 3 Sheets-Sheet 1
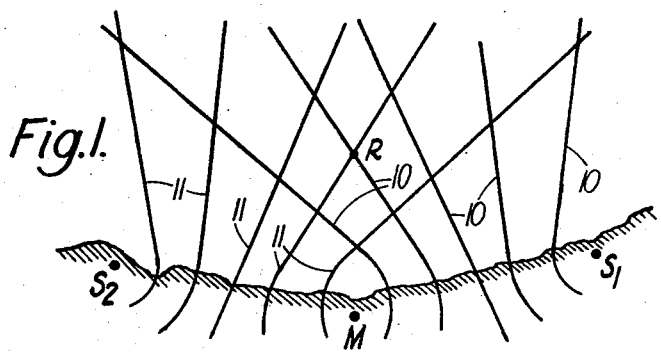
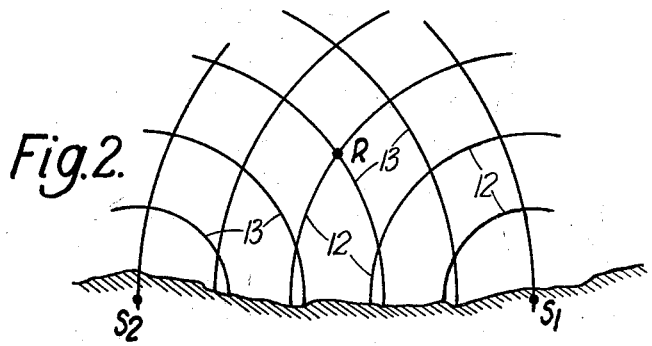
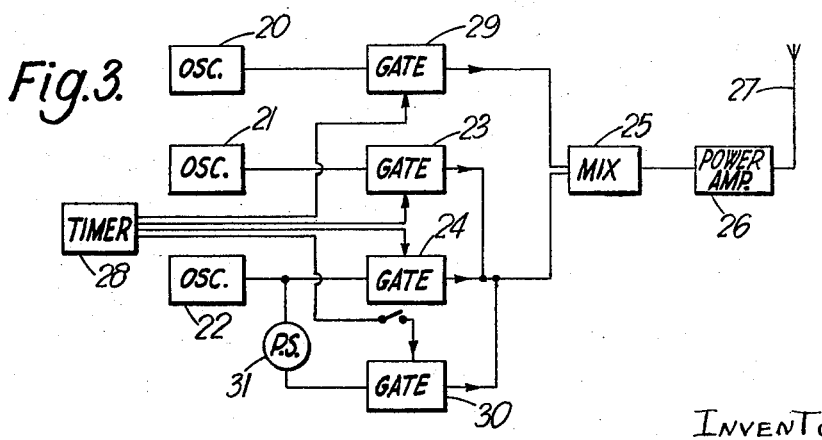
INVENTOR
W. ST. J. WHITE
By Mawhinney & Mawhinney
ATTORNEYS Nov. 24, 1964     W. ST. JOHN WHITE     3,158,863
HYPERBOLIC RADIO NAVIGATION SYSTEM
Filed May 19, 1961                         3 Sheets-Sheet 3
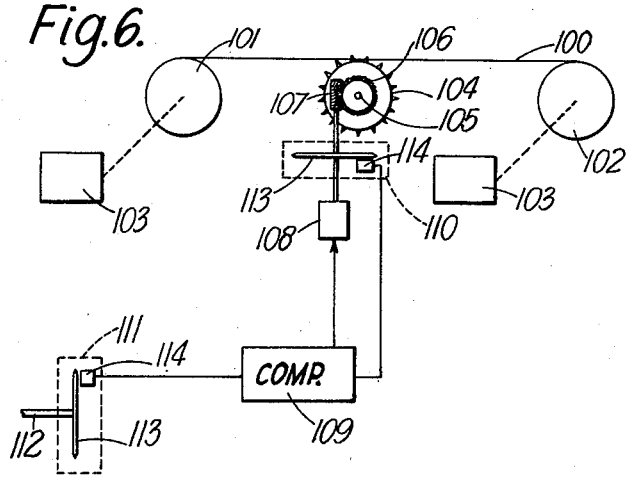
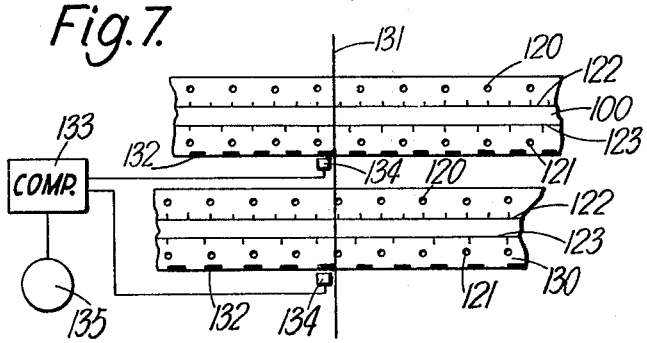
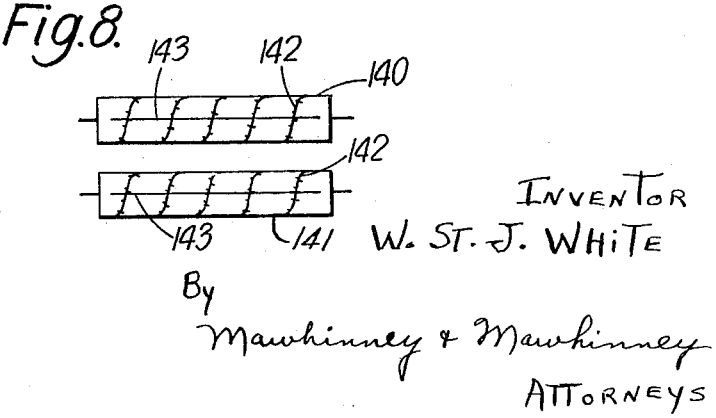
INVENTOR
W. ST. J. WHITE
By
Mawhinney & Mawhinney
ATTORNEYS United States Patent Office 3,158,863
Patented Nov. 24, 1964

3,158,863
HYPERBOLIC RADIO NAVIGATION SYSTEM
Wilfred St. John White, London, England, assignor to Decca Limited, a British company
Filed May 19, 1961, Ser. No. 111,393
Claims priority, application Great Britain May 20, 1960
3 Claims. (Cl. 343—105)

This invention relates to radio navigation systems of the kind, referred to hereinafter as a system of the kind described, in which signals are radiated from two spaced transmitting stations and in which a phase comparison is made at a mobile receiver between the received signals or signals derived therefrom so as to determine the equiphase position line (that is to say the line of constant phase relationship between the signals which are compared) which passes though the location of the receiver. The two transmitting stations may be at fixed locations in which case the equiphase position lines form a hyperbolic pattern. To obtain a position fix, two intersecting position lines are required and two pairs of transmitting stations may be employed, most conveniently with one station common to the two pairs. The invention is also applicable to systems in which one of the transmitting stations is located at the mobile receiver. With such an arrangement the equiphase position lines form a set of concentric lines about the fixed transmitting station. Usually two fixed transmitting stations will be arranged to co-operate with one mobile transmitting station located with the receiver on the craft whose position is to be determined and thus range measurements to the two fixed transmitting stations are obtainable. This latter kind of system is therefore commonly known as a two-range system. In both hyperbolic and two-range systems, the effective comparison frequency is usually such that there are a plurality of complete cycles (possible several hundred) of phase change in traversing the required operational area of the system and thus the phase measurement must determine not only the phase angle within a cycle but also identify the particular cycle.

According to this invention, in a system of the kind described in which the effective comparison frequency is such that a plurality of complete angles of phase change occur in traversing the required operational area of the system, the receiver has a phase angle measuring device driving an indicator comprising an index relatively movable wtih respect to a scale, the scale being of such length as to comprise without cyclic repetition at least the complete range of phase change in the required operational area of the system. With this construction the scale may be calibrated directly in terms of distance for a two range system or difference of distance for a hyperbolic system or in any other desired arbitrary units. Heretofore in radio navigation systems of this kind, a phase angle indicator has been employed with a pointer which traverses around a circular scale once for each complete cycle of phase change or for a multiple of complete cycles of phase change and an integrating counter has been used to count complete cycles of movement of the pointer. The actual magnitude of the distance or difference in distance represented by one revolution of the pointer is thus dependent on the effective comparison frequency. Since the scale has to be used repetitively in successive cycles, such a circular scale cannot therefore be calibrated in terms of distance or difference of distance in metres or other arbitrarily chosen units.

As indicated above, the invention is applicable both to two range systems and to hyperbolic systems. The invention includes in its scope a radio navigation system of the kind in which signals are radiated from two spaced transmitting stations at fixed locations and in which a phase comparison is made at a mobile receiver between the received signals or signals derived therefrom so as to determine the equiphase position line which passes through the location of the receiver and in which the transmitter spacing and effective comparison frequency is such that there are a plurality of complete cycles of a phase change traversing from one station to the other wherein the receiver has a phase angle measuring device driving an indicator comprising an index relatively movable with respect to a scale, the scale being of such length as to comprise without cyclic repetition at least the complete range of phase change in traversing from one station to the other. The scale can be calibrated directly in terms of difference of distance in any required units and hence it is possible to use the receiving equipment with a chart having hyperbolic lines representing the locus of points with predetermined differences of distance from the two stations in arbitrary units. The frequency of the transmitters may be changed and, by a simple change of the scale in the indicator, the equipment can still be used with the same chart. The charts can thus be computed without having to know the frequency or frequencies of operation of the transmitting stations. The invention is particularly useful in equipment used for survey purposes in which it is generally desirable to measure directly the differences of distance. Furthermore, such survey systems are often only operated temporarily and may have to operate on temporarily available frequencies which might have to be changed. By the arrangement of the present invention such frequency changes do not affect the charts in use but merely requires new scales in the indicators.

Very conveniently the scale is made in the form of a film or tape which is movable past a fixed index mark. In one such arrangement a film or tape with sprocket holes is employed, and is driven by a sprocket wheel through a suitable servo mechanism from a phase angle determining device. The two ends of the film or tape may be wound on spools and means provided so that, when the film or tape is moved in one direction, it is wound up on one spool and drawn off from the other. For this purpose the two spools may be provided with stall-torque motors which are arranged to tend to wind the film or tape onto the respective spools. Such motors can provide sufficient torque to maintain the film or tape in tension when it is being drawn off a spool against the direction of rotation of the motor and to wind the film or tape on when it is being fed towards a spool. In another arrangement, drives with friction clutches may be provided for the two spools to maintain the film or tape in tension and to wind it on if it is fed towards a spool.

Such a film or tape may conveniently be marked with a first linear scale representing phase angle, which scale would be the same for all films or tapes, and a second scale representing in the required units the distance for a two-range system or the difference of distances for a hyperbolic system.

The arrangement of the present invention has particular application in a navigation system in which two or more transmissions are made from the two stations to enable phase comparisons to be made on two different effective comparison frequencies. In such an arrangement two separate indicators may be provided each comprising a scale and index, the scales being appropriately calibrated to indicate the appropriate position line in terms of similar units, for example, differences of distance in metres or other units. The indications on the two scales would normally be the same. Since, however, the effective comparison frequencies for the two sets of transmissions are different, if one or both of the phase angle determining means should be in error by a complete cycle, the scale indications will not agree. The correct reading can be obtained by slipping one or each phase angle determining means an integral number of cycles of phase change, which is readily done as the drive system will inherently tend to take up a position representing a phase angle within a cycle, so as to make the scale readings for the two indicators agree. This arrangement thus provides a check on the correct setting of the scales which is equivalent to a check on the counting of complete cycles of phase change in a system employing a phase angle indicator with cycle counter. It will be noted, however, that using this arrangement with two scales, the frequencies of the different transmissions need not be related in any way and may be wholly independent of one another.

To compare the two indicator readings, the two scales may conveniently be arranged side by side with a common index mark extending across the two scales. Automatic means may be provided for checking that the readings on the two scales are the same; for example, on transparent film, there may be provided black markings at spaced points on the two difference of distance scales of the two films and a light source and photo-cell system may be used to check that corresponding marks pass the index simultaneously and to give warning if they do not.

This type of indicator is very commonly used in a navigation system in which signals of a single frequency are radiated alternately from two spaced points and their phase compared at the mobile receiver. In such an arrangement signals of a single frequency will provide an equiphase position line. Only two frequencies need be employed in a system using two sets of transmissions to give a direct check on the accuracy of the setting of the indicators.

The invention may be equally well used, however, with transmitting systems in which signals for comparison purposes are radiated continuously or intermittently from the transmitting stations on different but related frequencies. Two or more signals may be radiated from each station to provide a single comparison signal at the receiver.

It will be understood that in practice normally more than two transmitting stations would be employed. By using three or more stations, two intersecting position lines may be obtained to give a fix.

In the following description reference will be made to the accompanying drawings in which:

FIGURE 1 is a diagram illustrating a pattern of equiphase lines for a hyperbolic phase comparison system;

FIGURE 2 is a diagram illustrating a pattern of equiphase lines for a two range phase comparison system;

FIGURE 3 is a block diagram illustrating a master station;

FIGURE 6 is a diagram illustrating part of the indicating apparatus in a receiver;

FIGURE 7 is a diagram illustrating two film strips employed in indicating apparatus in a receiver; and FIGURE 8 is a diagram illustrating another type of indicating apparatus.

Figure 4:
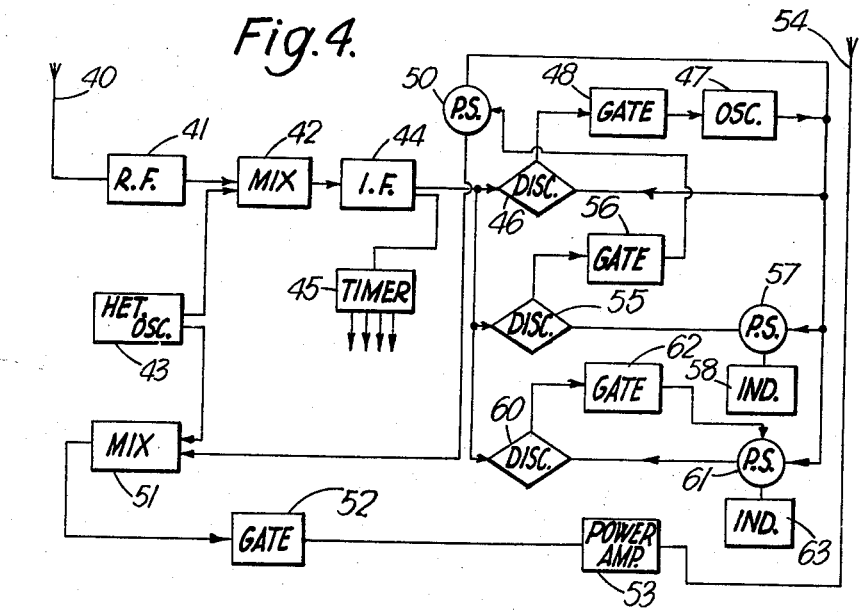
FIGURE 4 is a block diagram illustrating a slave station.

FIGURE 1 is a diagram illustrating a pattern of equiphase lines obtained in a hyperbolic phase comparison radio navigation system with three stations set up on land adjacent a coast line to provide position fixing in adjacent parts of the sea. Referring to that figure there is shown a master station M with two slave stations S1 and S2. The slave stations radiate signals which are locked in phase with the signals radiated from the master station so that, at a mobile receiver R, by measuring the phase relation between the signals received from the master station M and slave S1 it can be determined which of a number of hyperbolic equiphase lines 10 passes through the location of the mobile receiver R. Similarly by measuring the phase relationship between signals from the master station M and from the slave station S2 it may be determined which of the equiphase hyperbolic position lines 11 passes through the location of the receiver R. Such a hyperbolic system may be used with any number of receivers simultaneously.

FIGURE 2 illustrates a two-range phase comparison system. In such a system there are provided two slave stations S1 and S2 at fixed locations. The master station and the receiver are carried on the mobile craft R. The master station radiates signals which are picked up by the two slave stations. These slave stations radiate signals locked in phase to the master transmissions. At the mobile craft R the phase relationship is measured between the master signals and each of the two slave transmissions and these two phase determinations are representative of the particular equiphase position lines which pass through the position of the mobile craft. In such an arrangement the equiphase position lines consist of one set of concentric circles 12 about the position of the slave S1 and a second set of concentric circles 13 about the position of the slave S2. A two-range system in its simplest form can only be used by one craft at a time, but it has the advantage that the maximum accuracy is obtainable with only two fixed stations and there is no requirement for a chart with a hyperbolic lattice.

The present invention is applicable both to hyperbolic systems such as that of FIGURE 1 and the two-range system such as that of FIGURE 2. The equipment may be identical, the only difference being that for a hyperbolic system the master station is at a fixed location whilst, for a two-range system, the master station is on the mobile craft. In the particular embodiment of the invention now to be described the master station and the slave stations all radiate on the same frequency, the stations operating on a time sharing basis. Such a time sharing arrangement is not essential, however, for the operation of the system and the stations could operate with the master and slave stations radiating continuously on frequencies which are different but harmonically related to one another.

The master station in this embodiment is illustrated in FIGURE 3. This station is arranged to radiate a continuous wave trigger signal for synchronising purposes for a period of 0.1 of a second and then immediately after that to radiate a continuous wave signal of a very slightly different frequency for a period of 0.3 second. There is then an interval of 0.6 second before the cycle recommences with the next trigger signal. The frequency difference between the trigger signal and the normal radiation for phase comparison purposes may be quite small and typically a frequency difference of 60 cycles per second is used with a radiated frequency of the order of 2000 kc./s. The required frequencies for these radiated signals are produced in the arrangement illustrated in FIGURE 1 by means of three oscillators 20, 21 and 22. Oscillators 21 and 22 are relatively low frequency oscillators, for example, of the order of 132 kc./s. and these two oscillators have a frequency difference of the required difference between the trigger signal and phase comparison signal frequencies, that is to say the aforementioned 60 cycles per second. The outputs of the oscillators 21 and 22 are fed through gates 23, 24 respectively to a mixer 25. The gates 23, 34 are opened respectively during the periods of the trigger signal and phase comparison signal transmissions. In the mixer 25, the outputs of the oscillators 21, 22 are mixed, in cyclic sequence, with the output of the oscillator 20 which is a much higher frequency oscillator to produce the required radiated frequencies. The signal of the frequency to be radiated is then fed to a power amplifier 26 and thence to the transmitting aerial 27. The three oscillators 20, 21 and 22 are used so that the radiated frequencies may be altered as required merely by altering the frequency of the oscillator 20. The oscillators 21 and 22 will then ensure that there is the required frequency difference between the trigger signal and phase comparison signal. The output from the oscillator 20 to the mixer 25 is gated by a gating circuit 29 which is opened during both the trigger signal and phase comparison signal transmissions. The timing of the various transmissions is controlled by a timer unit 28 which opens the gates 23, 24 and 29 at the appropriate times. To initiate the cycle the timer first opens gates 23 and 29 for 0.1 second thereby admitting the outputs of the oscillators 20, 21 to the mixer 25 to provide the trigger signal. At the end of this trigger signal transmission the timer closes the gate 23 and opens the gate 24 thereby feeding the outputs of oscillators 20 and 22 into the mixer 25 to produce the required phase comparison transmissions. This transmission lasts for 0.3 second and there is then an interval of 0.6 second until the cycle recommences. Typically the timer might be a transistor relaxation oscillator operating as a ring counter and the exact frequency of operation is not critical.

For checking and servicing other items of equipment it may be desirable to use the master station to provide not only a master signal but also simulated slave signals and for this purpose there is provided a further gate 30 which connects the oscillator 22 to the mixer 25 through a phase shifter 31. This phase shifter preferably is a continuously variable phase shifter of the goniometer type so that the phase of the mixed signal may be adjusted to any required value or may be continuously varied. When it is required to provide a simulated slave signal the gate 30 is opened for 0.3 second at a time interval of either 0.3 second or 0.6 second after the end of the trigger signal depending on whether it is required to simulate the signal of slave 1 or slave 2.

The two slave units, except for the timing of their transmissions in the cycle, are identical and one slave station is illustrated in FIGURE 4. Slave 1 transmits for a period of 0.3 second after the end of the master transmission whilst slave 2 transmits for a period of 0.3 second after the end of the slave 1 transmission. The slave station shown in FIGURE 4 has a receiving aerial 40 for receiving the transmissions from the master station. In the particular arrangement illustrated in FIGURE 4 a heterodyne type receiver is employed but a straight receiver may be used if desired. The received signals after amplification in a radio frequency amplifier 41 are fed to a mixer 42 where they are mixed with the output of a heterodyne oscillator 43 to produce an intermediate frequency signal which is amplified in an intermediate frequency amplifier 44. Very conveniently the heterodyne oscillator 43 has a frequency such that the intermediate frequency is the same as the frequencies from the oscillators 21, 22 at the master station. The intermediate frequency amplifier has a bandwidth so as to accommodate both the phase comparison transmissions and the trigger signals from the master station. The trigger signals are extracted by a frequency selective circuit and fed to a timer and delay circuit 45 providing gate operating pulses for operating gates to be described later. The output from the intermediate frequency amplifier is fed to one input of a phase discriminator 46. Into the other input of this discriminator is fed the output from a stable oscillator 47 tuned to the intermediate frequency corresponding to the phase comparison transmissions. The discriminator thus gives an output when there is any phase difference between the output of the oscillator 47 and the received signal from the intermediate frequency amplifier 44. This output from the discriminator is gated by a gating circuit 48 which is opened only during the period of the phase comparison transmissions from the master station by means of the timer 45. The output from the gating circuit 48 is thus representative of the difference of phase between the oscillator 47 and the received master signals. From the gating circuit 48 the output of the discriminator is fed as a control signal to control the phase of the oscillator 47 to hold that phase in a predetermined relationship with the phase of the received master signals. The oscillator 47 is a high stability oscillator with a natural frequency equal to the intermediate frequency output from the amplifier 44 corresponding to the phase comparison transmissions of the master station. The gate circuit 48 prevents the oscillator control being affected by any signals except the appropriate transmissions from the master station and the oscillator 47 thus provides a continuous signal output having a phase which represents the phase of the master transmissions.

The output from this ocsillator 47 is used to provide the required signals for radiating from the slave station and for this purpose the output from the oscillator 47 is fed through a goniometer type phase shifter 50 to a mixer 51 where the signals are mixed with signals from the aforementioned heterodyne oscillator 43 to produce an output of the same radio frequency as the master transmissions. The output from the mixer 51 is fed through a gate 52, which is opened by the timer 45 during the period of the required slave transmission in each cycle, and thence to a power amplifier 53 which amplifies the signals for radiation from an aerial 54. There is also provided a phase discriminator 55 which compares the output from the intermediate frequency amplifier 44 with the output from the oscillator 47. This discriminator output should be zero during the period of the slave transmission if the signals are perfectly locked in phase. If, however, any phase change should occur between the master signals and the local slave transmission, the output of the discriminator 55 during this period is no longer zero. The output from the phase discriminator 55 is fed through a gate 56 to a servo drive for the aforementioned phase shifter 50. The gate 56 is opened during the period of the slave transmission so that the discriminator 55 compares the phase of the slave signal as radiated from the aerial 54 and picked up by the receiving aerial 40 with the phase of the output of the locked oscillator 47 so that this discriminator provides a drive to the phase shifter 57 only when the slave station is radiating, the discriminator detecting any local phase shifts in the transmitting system. A goniometer type phase shifter 57 is connected between the output of the oscillator 47 and the input to the discriminator 55 to enable phase adjustment to be effected of the pattern produced by the master and this slave. Alteration of the phase shifter 57 thus shifts the equiphase lines of the pattern. The pattern is usually standardised with zero phase shift on the phase shifter 57 and an indicator 58 is coupled to the phase shifter 57 for indicating this phase shift. The phase shifter 57 may be manually adjusted however if it is desired to alter the phase relationship between the slave transmission and the received master signal.

It is also convenient at each slave station to have an indicator indicating the phase relation at that slave station between the transmissions from the master station and the transmissions from the other slave station, so that each slave station can be used as a monitor for the other slave. For this purpose there is provided a further phase discriminator 60 which compares the phase of the output of the intermediate frequency amplifier 44 with the phase of the output from the oscillator 47. The output of the oscillator 47 is fed to the phase discriminator 60 through a goniometer type phase shifter 61 and this phase shifter 61 is servo-driven by the discriminator output during the period of the appropriate slave transmission, that is to say when the monitor phase measurement can be made, a gate 62 being provided in the discriminator output circuit for this purpose. The output of the discriminator 60 thus sets the phase shifter 61 to a value to give a standard datum relationship between the two inputs to the discriminator 60, conveniently an in-phase relationship, and the setting of the phase shifter 61 is thus a measure of the actual phase relationship between the output of the oscillator 47 and the output of the intermediate frequency amplifier 44 during the appropriate time periods when the gate 62 is open. This setting is indicated on an indicator 63 conveniently in the form of a digital display, the goniometer type phase shifter 61 driving a digital counter for this purpose.

In the slave station, the gates 48, 52, 56 and 62 are controlled by the timer 45, which serves to open each gate for the appropriate period. Very short duration guard intervals are provided between the closing of one gate and the opening of the next to allow a reasonable tolerance in the transmission cycle timing to prevent any transient or overlap effects on the operation.

Figure 5:
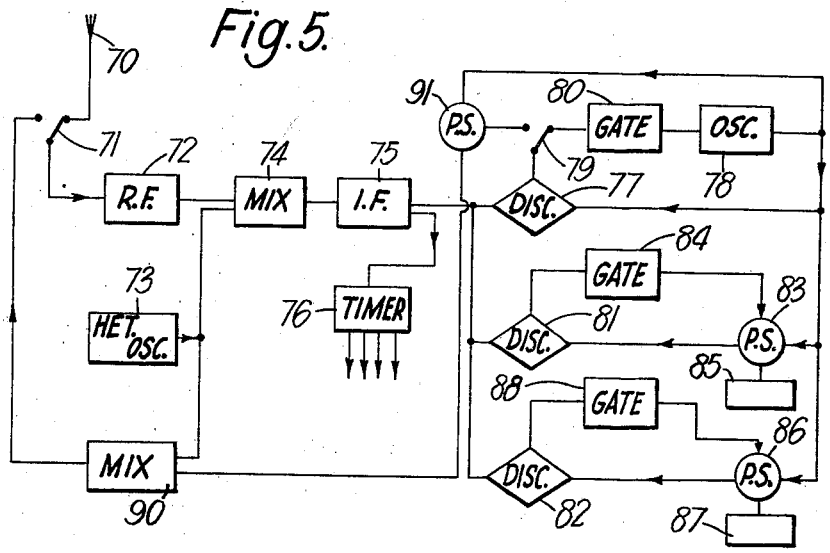
FIGURE 5 is a block diagram illustrating a receiver.

FIGURE 5 illustrates a mobile receiver and it will be seen that this receiver is very similar to the receiving equipment used in a slave station. In practice it is convenient to use identical equipment which can be switched alternatively for use either as a mobile receiver or as a receiving unit for a slave station. In the receiving equipment illustrated in FIGURE 5 there is an aerial 70 for receiving the radiated signals. These signals pass through a switch 71 to a radio frequency amplifier 72 where they are amplified and then mixed with the output of a heterodyne oscillator 73 in a mixer 74 to give an intermediate frequency signal which is amplified by an intermediate frequency amplifier 75. This amplifier has a sufficiently wide pass-band to amplify not only the master and slave phase comparison transmissions but also the slightly different frequency trigger transmission from the master station. In the receiving equipment, the trigger signals are separated by a frequency selective circuit and fed to a timer 76 which controls the operation of various gating circuits as hereinafter described. A phase discriminator 77 compares the phase of the output of the intermediate frequency amplifier 75 with the phase of an output of the same frequency from a stable oscillator 78. If the output of the oscillator 78 is in phase with the output from the intermediate frequency amplifier 75 there is no output signal from the phase discriminator 77. Any phase variation however produces an output from the discriminator which is fed through a switch 79 and a gate 80 to control the oscillator 78 to bring the latter back to the required phase condition. The gate 80 is opened only during the period of the master phase comparison transmissions and thus the oscillator 78 is maintained in phase with the received master signals. The output of the oscillator 78 is thus representative of the phase of the master signals. The output from the oscillator 78 is continuously available however and it can therefore be compared in phase with the two received slave signals, when those signals are received, to provide the required phase indications. For this purpose there are provided two further phase discriminators 81, 82. To one input of the discriminator 81 is fed the signal from the intermediate frequency amplifier 75 whilst to the other input there is fed the reference signal from the oscillator 78 through a goniometer type phase shifter 83. If the signal from the oscillator 78 after passing through the phase shifter 83 differs in phase from the input signal from the amplifier 75 the discriminator 81 gives an output which is fed through a gating circuit 84 to a servo drive for the phase shifter 83 to drive the latter in a direction so as to correct for this phase deviation. The gating circuit 84 is opened during the period of transmissions from slave 1 and thus the phase shifter 83 is maintained set in a condition representative of the phase relationship between the received master signals and the received signals from slave 1. In this type of phase measuring device using a servo-driven phase shifter in one of the inputs to the phase discriminator the phase shifter is driven by a servo motor to maintain the output of the phase discriminator at zero volts. The phase shifter thus makes one revolution for each cycle of phase difference and is servo-driven; it may therefore readily be arranged to have sufficient torque to drive various forms of display devices. The shaft of the phase shifter 83 in the present arrangement drives a display unit 85 which will be described in further detail later with reference to FIGURE 6. This display unit 85 thus displays the phase relationship between the signals from the master station and slave S1 at the location of the receiver.

The phase discriminator 82 is connected in a circuit similar to that of phase discriminator 81. One input to the phase discriminator 82 is from the intermediate frequency amplifier 75 whilst the other input is from the oscillator 78 through a goniometer type phase shifter 86. This phase shifter 86 is driven by a servo-motor controlled by the output of the discriminator 82 during the period of the slave 2 transmissions, the output of the discriminator, for this purpose, being passed to the servo drive for the phase shifter through a gate 88 which is opened only during these slave 2 transmissions. The goniometer type phase shifter 86 drives an indicator 87 which is similar to the indicator 85, but which indicates the phase relationship between the signals received from the master station and slave 2.

The use of identical frequencies for the master and slave transmissions largely frees the system, in effecting a phase comparison, from differential phase errors due to thermal or other causes. It is desirable, however, to provide referencing means whereby the whole receiver from the aerial input circuit onwards may be checked if desired. Such a referencing signal provides in the receiver a phase datum which will be the same for all users of the system and thus permits of true repeatability of measurements. For this purpose an internal signal is generated by beating the outputs of the oscillator 78 and the heterodyne oscillator 73 in a mixer 90 to provide a signal of the received radio frequency. By means of the switch 71, this internally generated signal from the mixer 90 may be fed into the radio frequency amplifier 72 in place of signals from the aerial 70. The switch 71 is ganged with the aforementioned switch 79 so that, when referencing, the output of the phase discriminator 77 is applied to a servo motor driven goniometer type phase shifter 91 in the circuit from the oscillator 78 to the mixer 90. The phase shifter 91 will thus turn so as to equalise the phase of the reference signals applied to the two sides of the two phase discriminator and indicator circuits 81, 83, 84 and 82, 88, 86 respectively. When this condition is satisfied the two indicators 84, 87 should read zero. If either does not, it may be manually corrected by rotating the stator of the appropriate goniometer type phase shifter 83 or 86.

It will be noted that the oscillator 47 in each of the slave stations and the oscillator 78 in the receiver oscillates at the predetermined intermediate frequency. Thus to change the frequency of operation of the system, it is merely necessary to change the frequency of oscillator 29 at the master station and to make the corresponding changes in the frequency of the heterodyne oscillator 43 at each slave station and the heterodyne oscillator 73 at each receiver. Conveniently multi-position switches are provided at each transmitter and receiver to enable any one of a number of different frequencies to be selected.

FIGURE 6 illustrates one form of phase indicator such as may be used as the indicator 85 or 87. Referring to FIGURE 6 there is shown a strip of film or tape 100 which extends between two spools 101, 102. Each of these spools is provided with a stall-torque motor 103 which tends to drive the spool in a direction to wind up the tape and thus the tape is kept stretched tight between the two spools. The tape is driven by means of a sprocket wheel 104 engaging the sprocket holes in the film or tape, this sprocket wheel being mounted on a shaft 105 carrying a toothed wheel 106 engaged by a worm 107 driven by a motor 108. In the particular arrangement illustrated the motor 108 is driven by the output of a comparator 109 which compares a digital output obtained from a digitiser 110 mounted on the shaft of the worm 107 with a digital output from a digitiser 111 mounted on a shaft 112 which may be the shaft of the phase shifter 83 or 86. The digitisers 110 and 111 may each comprise a digit disc 113 with sensing head 114. It will be seen that the comparator 109 compares the two digital outputs and drives the motor 108 to maintain these two digital outputs equal so that the worm 107 is driven exactly in accordance with the rotation of the shaft 112. The two digitisers 110, 111 and comparator 109 not only provide a convenient servo-drive for the film or tape 100 but also provide the phase comparison information from the receiver in digital form for feeding, if required, to a digital display or printer.

The film or tape 100 may be of the form shown in FIGURE 7 having sprocket holes 120 along each side of the tape and having a first set of markings forming a scale 122 representing cycles of phase relationship and a second set of marking forming a scale 123 representing units of distance for a two-range system or difference of distances for a hyperbolic system. The scale 123 would have to be drawn in accordance with the operating frequency of the system. Typically the system might be switchable to operate on five different frequencies and in that case five alternative tapes would be provided.

The rotations of the phase shifters 83, 86 in the receiver and of the digitisers 110, 111 are proportional to cycles of phase change and thus any output from the digitisers gives the information in terms of "lanes" that is to say the distances between successive equiphase lines in the pattern corresponding to the successive cycles of phase change. Such indications therefore depend on the operating frequency. The readings however from the scale 123 on the film or tape are directly in any selected units of distance, e.g. feet or metres, and the readings are therefore independent of the frequency of operation. In a two-range system there is thus an obvious and important simplification of position determining since the frequency of operation need not be known and it is not necessary to have any specially computed charts. In a hyperbolic system, a standard lattice can be drawn having equiphase lines for difference of distances in the selected standard units and such a chart can be used for any frequency of operation.

Conveniently an indicator unit is provided with two tapes 100, 130 arranged side by side as shown in FIGURE 7, the two tapes having independent drive systems co-operating wtih a common index mark 131 extending across both tapes and conveniently on a transparent window over the tapes. In the simplest form of the system thus far described having two slave stations and one master station radiating each on a single frequency, the two tapes may be driven in accordance with the two phase shifters 83, 86 in the receiver so that the position of the index 131 on the two scales 123 indicating the two position lines in the intersecting equiphase patterns. Such an arrangement using only a single frequency from each station is satisfactory for most purposes. When the equipment is set in operation, the two tapes 100, 130 are set to the appropriate lane and they will then serve not only to indicate the position within a lane (i.e. a cycle of phase change) but also to identify the particular lane by integrating the changes as the receiver is moved. In some cases, however, it may be desired to provide a lane identification system for determining, without prior knowledge of the position of the mobile receiver, the particular lane to which the indicators should be set. Lane identification may readily be obtained by providing at the positions of the master and two slave stations respectively a further master and slave transmitting stations identical with the equipment described with reference to FIGURES 3 and 4 but operating on a different frequency. In effect the master and slave stations are duplicated but it is convenient to feed the outputs from the two transmitters at each station into a common antenna and preferably the timing unit at the master station is common to synchronise the timing sequences for the transmissions on the two frequencies. The two frequencies may be quite unrelated and might typically differ by about 5% or 10% of one of the frequencies. At the receiving location two separate receivers of the kind illustrated in FIGURE 5 are provided. The outputs from the phase shifters 83 of the two receivers representative of the position line with respect to the first slave pattern are fed to drive the two tapes 100, 130 of one indicator unit and the two outputs from the phase shifters 86 of the two receivers representative of the slave 2 pattern are fed to drive the two tapes 100, 130 of a second indicator unit. In each indicator unit the two tapes would have the scales 123 drawn for the appropriate different frequencies but, provided the apparatus has been set up and is operating correctly, the indication on the two distance scales 123 at the index 131 will be identical. The tape markings for the two scales 123 will differ in their spacing along the tape and the two tapes will move at different speeds as the mobile craft moves so as to keep the readings on the two tapes at the index mark identical. If one or both of the phase angle determining means should be in error by a complete cycle, the scale indications will not agree. The correct reading can be obtained by slipping one or each phase angle determining means an integral number of cycles of phase change which is readily done as the drive system inherently tends to take up a position representing a phase angle in the cycle so that manual adjustment is readily effected through exactly one complete cycle. The slipping is effected so as to make two scale readings agree. As previously explained it is normally sufficient merely to use one frequency and one tape and such an adjustment would only be effected on initial setting up of the equipment. The provision of operation on two frequencies wtih two indications in this manner, however, provides a check on the correct setting of the scales which is equivalent to a check on the counting of complete cycles of phase change in a system employing a phase angle indicator with a cycle counter. It will be noted, however, that since direct reading distance scales are employed there is no requirement for the frequencies of the different transmissions to be related to one another and they may be wholly independent.

Automatic means may be provided for checking the identity of the readings on the two tapes. As one example of such means, black markings 132 may be provided on the tapes and a comparator 133 compares the outputs of photocells 134 responsive to these markings 132, the comparator 133 operating an alarm 135 to give a warning if corresponding marks do not pass the index 131 simultaneously. It will be understood that the markings 132 and the comparator 133 with its associated equipment would only be provided if the two tapes are both used for comparison of signals from one pair of stations.

An alternative form of indicating device which may be more convenient than a film or tape in some cases is illustrated in FIGURE 8. In this indicating device there are provided two drums 140, 141 which are mounted conveniently with their axes horizontal one above the other. The two drums may be driven from the two phase shifters 83, 86 of FIGURE 5 using a servo drive system similar to that illustrated in FIGURE 6. The drums are arranged to make a number of complete revolutions for each cycle of phase change and each drum has a helical line 142 alongside which are put scale markings. Very conveniently on one side of the line there are put scale markings corresponding to cycles of phase change and on the other side of the line markings corresponding to distance in predetermining units such as feet or metres. The two drums are arranged in a display unit allowing the front of each drum to be seen, with an index mark 143 extending along each drum parallel to the drum axis. It will be seen that the scales on the drums are equivalent to the scales on the tapes 100, 130 and that the required position line is identified by noting where the index mark 143 crosses the appropriate part of the helical scale. The scales may be marked in angular phase changes or in any arbitrary units of distance. This system is particularly suitable for short base line systems where there would only be a few turns on the helix. The arrangement of FIGURE 8 has the advantage that the scale markings may be made on a relatively small sheet of paper for fixing to the drum thereby facilitating the drawing of the scales for any new frequency.

Instead of using a drum with a helical scale, it would be possible to use a disc co-operating with a rotating pointer. For lane identification, a multi-armed pointer may be used driven in accordance with the measured phase change so that each revolution of the pointer may correspond to several complete cycles of phase change. A spiral scale would enable a long scale without cyclic repetition to be provided.

I claim:
1. In a phase comparison radio navigation system, the combination of two spaced transmitting stations radiating signals in fixed phase relationship, signals of two frequencies being radiated by each station to enable two independent phase comparisons to be made between radiated signals, a mobile receiver arranged to receive said signals and to provide outputs representative of the phase relationships between the signals at each of the two frequencies, two tapes each having a scale, means housing said tapes side by side for parallel movement, said means including a common index mark and said scales being calibrated in accordance with the respective effective comparison frequencies to have markings in the same units of difference of distance of the receiver from the two stations, and two servo means each arranged independently to drive said tapes in accordance with the said outputs from the mobile receiver.

2. In a phase comparison radio navigation system, the combination of two spaced transmitting stations radiating signals of fixed phase relationship, signals of two frequencies being radiated by each station to enable two independent phase comparisons to be made between radiated signals, a mobile receiver arranged to receive said signals and to provide outputs representative of the phase relationship between the signals at each of the two frequencies, two tapes each having a scale, means housing said tapes side by side for parallel movement, said means including a common index mark and said scales being calibrated in accordance with the respective effective comparison frequencies to have markings in the same units of difference of distance of the receiver from the two stations, and two servo means each arranged independently to drive said tapes in accordance with the said outputs of the receiver, automatic means for checking the identity of the readings on the two tapes, and manual adjusting means for moving either of the tapes a distance corresponding to a complete cycle of phase change at the respective effective comparison frequency.

3. In a phase comparison radio navigation system, the combination of two spaced transmitting stations radiating signals of fixed phase relationship, signals of two frequencies being radiated in time sharing sequence by each station to enable two independent phase comparisons to be made between radiated signals, a mobile receiver arranged to receive said signals and to provide outputs representative of the phase relationship between the signals at each of the two frequencies, two tapes each having a scale, means housing said tapes side by side for parallel movement, said means including a common index mark and said scales being calibrated in accordance with the respective effective comparison frequencies to have markings in the same units of difference of distance of the receiver from the two stations, two servo means each arranged to drive a sprocket wheel engaging sprocket holes in a tape so as to drive said tapes independently in accordance with the said outputs from the receiver, two photo electric means each arranged in said housing over a tape to produce an output indicative of the reading thereon, comparator means arranged to compare the outputs of the said photo electric means and to produce a warning signal if said outputs are not substantially identical, and manually operated means for moving either of said tapes a distance corresponding to a complete cycle of phase change at the respective effective comparison frequency.

References Cited in the file of this patent

UNITED STATES PATENTS

| | | |
|---|---|---|
| 2,144,203 | Shanklin | Jan. 17, 1939 |
| 2,248,727 | Strobel | July 8, 1941 |
| 2,394,287 | Bludworth | Feb. 5, 1946 |
| 2,408,773 | Goodall | Oct. 8, 1946 |
| 2,513,315 | Hawkins | July 4, 1950 |
| 2,582,588 | Fennessy et al. | Jan. 12, 1952 |
| 2,598,290 | O'Brien | May 27, 1952 |
| 2,769,977 | Roberts et al. | Nov. 6, 1956 |

OTHER REFERENCES

Casselman et al.: VLF Propagation Measurements for the Radux-Omega Navigation System, in Proceedings of the IRE, pages 829, 839.